(12) United States Patent
Höppner et al.

(10) Patent No.: US 7,357,590 B2
(45) Date of Patent: Apr. 15, 2008

(54) BALL-AND-SOCKET JOINT

(75) Inventors: Holger Höppner, Steinfeld/Mühlen (DE); Carsten Schütte, Stemwede-Dielingen (DE)

(73) Assignee: ZF Lemförder GmbH, Lemförde (DE)

( * ) Notice: Subject to any disclaimer, the term of this patent is extended or adjusted under 35 U.S.C. 154(b) by 25 days.

(21) Appl. No.: 10/873,628

(22) Filed: Jun. 21, 2004

(65) Prior Publication Data

US 2004/0265046 A1    Dec. 30, 2004

(30) Foreign Application Priority Data

Jun. 20, 2003   (DE) ............... 103 28 109

(51) Int. Cl.
  *F16B 1/12*   (2006.01)
(52) U.S. Cl. .............. 403/122; 403/131; 403/133; 403/135
(58) Field of Classification Search ......... 403/122, 403/133, 135, 141, 131; 411/521, 526, 528
See application file for complete search history.

(56) References Cited

U.S. PATENT DOCUMENTS

| | | | | |
|---|---|---|---|---|
| 2,321,157 A | * | 6/1943 | Rees ........................... 411/521 |
| 2,361,025 A | * | 10/1944 | Graham et al. .............. 403/37 |
| 3,063,744 A | * | 11/1962 | Flumerfelt .................. 403/133 |
| 3,068,031 A | * | 12/1962 | Herbenar et al. ........... 403/133 |
| 3,413,023 A | * | 11/1968 | Herbenar .................... 403/135 |
| 4,256,413 A | * | 3/1981 | Abe ............................ 403/282 |
| 4,714,368 A | * | 12/1987 | Sawada et al. ............. 403/132 |
| 4,966,488 A | * | 10/1990 | Mayhew ..................... 403/135 |
| 5,230,580 A | * | 7/1993 | Henkel ....................... 403/135 |
| 5,380,114 A | * | 1/1995 | Urbach ....................... 403/140 |
| 5,704,727 A | * | 1/1998 | Atkins et al. ............... 403/135 |
| 5,855,448 A | | 1/1999 | Showalter et al. |
| 5,904,436 A | * | 5/1999 | Maughan et al. ........... 403/140 |
| 6,164,829 A | * | 12/2000 | Wenzel et al. .............. 384/203 |
| 6,164,861 A | * | 12/2000 | Maughan .................... 403/135 |
| 6,190,080 B1 | | 2/2001 | Lee et al. |
| 6,505,990 B1 | * | 1/2003 | Maughan .................... 403/135 |
| 2002/0197103 A1 | * | 12/2002 | Maughan .................... 403/135 |

FOREIGN PATENT DOCUMENTS

DE    199 14 452 A1    10/1999

\* cited by examiner

*Primary Examiner*—Daniel P. Stodola
*Assistant Examiner*—Daniel J. Mills
(74) *Attorney, Agent, or Firm*—Norris McLaughlin & Marcus, PA

(57) ABSTRACT

A ball-and-socket joint, for example for use with an articulated support in an automobile, includes an essentially ring-shaped or cup-shaped joint housing and a bearing shell disposed in an interior space of the joint housing. The ball of a ball pin is slidingly received in the bearing shell. The inside contour of the joint housing and the outside contour of the bearing shell are essentially shaped as a truncated cone. The bearing shell can be essentially freely positioned in the joint housing in an axial direction of the ball pin. The position at which the bearing shell is anchored in the joint housing can then be precisely and reproducibly adjusted by way of the truncated conical surfaces. The service life, robustness and quality of ball-and-socket joints can be significantly improved during manufacture, while simplifying their fabrication and reducing their manufacturing cost.

14 Claims, 2 Drawing Sheets

BALL-AND-SOCKET JOINT

BACKGROUND OF THE INVENTION

The invention relates to a ball-and-socket joint, in particular for a swivel support for use in an automobile.

Ball-and-socket joints are used, for example, in swivel supports to dampen or prevent force- or torque-induced reaction movements of, for example, drive trains, engines or drive train components in automobiles.

A ball-and-socket joint is described, for example, in U.S. Pat. No. 6,190,080 B1. This ball-and-socket joint has a joint housing in form of a hollow cylinder, wherein a bearing shell made of plastic is inserted in its interior space for slidingly receiving a swivel ball arranged on a ball pin. The bearing shell of the ball-and-socket joint described in the above-referenced patent is supported in the axial direction of the joint housing on two circumferential annular shoulders located on the two end faces of the joint housing.

The first of the two circumferential annular shoulders is initially formed on the plastic bearing shell, whereas the second annular shoulder of the bearing shell that faces the first annular shoulder in this conventional ball-and-socket joint is implemented as a ring-shaped snap connection that is stabilized by an additional cover that is pressed into the second annular shoulder.

In other words, the conventional ball-and-socket joint is assembled by inserting the bearing shell into the housing so that the first annular shoulder is supported on a first end face of the joint housing, whereas the second annular shoulder is realized by snapping together the ring-shaped snap connection and subsequently pressing the safety cover on.

Other known techniques for anchoring the bearing shell in the joint housing produce the second annular shoulder, for example, by forming a flange with an ultrasound technique, or employ safety rings or locking rings for anchoring the bearing shell in the joint housing in the axial direction. It is also known, for example from DE 199 14 452 A1 and U.S. Pat. No. 5,855,448 to form the bearing shell and the joint housing with matching conically contours, and then inserting the bearing shell into the joint housing up to an axial limit stop. The bearing shell is pretensioned in the axial direction when the joint housing is closed. The axial pretension is applied to compensate for any changes when the bearing shell settles and/or the bearing surfaces wear down.

However, it has been observed that anchoring the plastic bearing shell in the joint housing in this way often fails to satisfy the requirements of the ball-and-socket joints with respect to load-bearing capacity, fail-safe operation and torsional stiffness of the bearing shell, as well as manufacturing costs. One reason is that the bearing shell of conventional ball-and-socket joints is typically secured in the joint housing by an axial force or shape engagement, or through an axial pretension, which is frequently inadequate to permanently fix the position of the bearing shell in the joint housing due to the load applied to the ball-and-socket joint during operation.

Moreover, manufacturing tolerances in the bearing shell and the joint housing, as well as poor reproducibility of the attachment, can lead to significant variations in the quality of conventionally manufactured ball-and-socket joints. This is particularly the case with the commonly used connection between the bearing shell and the joint housing which is based on forming or flanging the bearing shell or producing an edge on the joint housing. The connection between a conical bearing shell and a conical joint housing in conventional ball-and-socket joints produced by pressing the bearing shell into the joint housing is also poorly reproducible. It is also not possible with conventional ball-and-socket joints to afterward adjust, for example, the play or other tolerances in order to reduce unacceptable manufacturing tolerances, because the conventional ball-and-socket joints can typically not be adjusted after assembly.

Consequently, a bearing shell that is essentially affixed in the joint housing in the axial direction through shoulders or limit stops, is frequently unable to permanently satisfy today's requirements with respect to torsional stiffness of the bearing shell in the joint housing, reproducible manufacturing tolerances of the ball-socket joint dimensions, and absorbing large radial loads and shocks. This situation can be aggravated if other types of stress are generated when the ball-and-socket joint is exposed, for example, to vibrations, aggressive substances and/or abrasive materials, which occurs frequently in automobiles.

It would therefore be desirable to provide a ball-and-socket joint that eliminates the aforedescribed disadvantages and that significantly improves anchoring of the bearing shell in the joint housing, while also improving the cost structure and process reliability in manufacturing.

SUMMARY OF THE INVENTION

According to one aspect of the present invention, a ball-and-socket joint includes an essentially ring-shaped or cup-shaped joint housing and a bearing shell disposed in an interior space of the joint housing, wherein the ball of a ball pin is slidingly received in the bearing shell. The inside contour of the joint housing and the outside contour of the bearing shell are essentially shaped as a truncated cone. The bearing shell can essentially be freely positioned in the joint housing in an axial direction of the ball pin.

The bearing shell of the ball-and-socket joint of the invention is hereby fixed in the joint housing in a conventional manner in that the bearing shell which has an exterior conical taper is anchored in the joint housing which has a matching interior conical taper through insertion in an axial direction, whereby the position is subsequently fixed in the axial direction. However, unlike conventional ball-and-socket joints, the bearing shell in the ball-and-socket joint of the invention is not inserted or pressed until it reaches a limit stop defined by the geometry of the bearing shell and the joint housing. The ball-and-socket joint of the invention does not have an axial limit stop that defines the position of the bearing shell in the joint housing in the axial direction of the pin; instead, the bearing shell can move within a certain range in the axial direction about its nominal position in the joint housing.

Accordingly, the bearing shell can be controllably and reproducibly anchored in the joint housing by controlling certain parameters, such as the pressing force and/or pressing depth during assembly of the ball-and-socket joint. Inevitable tolerances in the joint housing which is mostly formed without cutting, can hence be compensated by varying and adjusting the force and/or the travel during the pressing operation.

In addition, anchoring the bearing shell in the joint housing by way of the truncated conical surfaces that are controllably pressed into each other creates a significantly improved, much more robust and permanent connection between the bearing shell and the joint housing than would otherwise be possible with conventional anchoring methods, which operate mostly with axial limit stops and/or axial anchoring forces.

The actual configuration by which the bearing shell is fixed and secured in the joint housing in the axial direction of the pin is not important for the invention, as long as the initial position of the bearing shell at the time when the bearing shell was pressed in, cannot change accidentally during the operation of the ball-and-socket joint. Accordingly, the bearing shell can be axially affixed in the joint housing by any known method, for example by a clamp or screw connection, with an adhesive, or by forming a flange.

According to an advantageous embodiment of the invention, the conical bearing shell is anchored in the joint housing by making the slope angle of the conical truncated outside contour of the bearing shell and the slope angle of the also truncated conical inside contour of the joint housing small enough so as not to exceed the friction angle of the material pair formed of bearing shell and joint housing; in other words, the bearing shell and the joint housing are automatically locked. In this way, the bearing shell can be controllably and permanently connected with the joint housing simply by axially pressing the bearing shell into the joint housing. The slope ratio can be, for example, approximately one to five.

According to another advantageous embodiment of the invention, the bearing shell can be fixed in the axial direction relative to the joint housing by a locking ring arranged between the joint housing and the bearing shell. This axial attachment can be provided in addition to an automatic lock between the bearing shell and the joint housing as an additional safety to prevent the bearing shell from being pulled out of the joint housing. The axial attachment by a locking ring can also be employed if the selected slope angle for the outside contour of the bearing shell and the joint housing are unable to reliably lock the bearing shell with the joint housing automatically.

According to another advantageous embodiment of the invention, the locking ring can be arranged on the joint housing on the side of the ball pin. With this arrangement, the locking ring exerts an additional pressing force on the bearing shell, which presses the bearing shell into the conical joint housing or prevents the connection between the bearing shell and the joint housing from loosening. Alternatively, the locking ring can also be arranged on the joint housing on the side of the housing cover, i.e., on the side facing away from the ball pin. When the locking ring is configured in this way, which is particularly suited for a ring-shaped joint housing, then the bearing shell is fixed by the locking ring in the joint housing by additional tension forces applied to the bearing shell.

Additional advantages can be obtained by arranging the locking ring opposite the ball pin. For example, the construction of the entire ball-and-socket joint, in particular of the joint housing, becomes much simpler. Moreover, the ball-and-socket joint can be more easily assembled less expensively, because the locking ring that faces the ball pin is readily accessible. A ball-and-socket joint with such a locking ring arrangement can also be easily adjusted to compensate for wear and to produce zero clearance without requiring special and potentially complex devices simply by once more applying pressure. The locking ring located opposite the ball pin also provides a better visual control to ensure that the ball-and-socket joint is securely assembled.

According to another advantageous embodiment, the bearing shell can be prevented from being pulled out of the joint housing in the axial direction by forming a flange on the bearing shell on the side of the housing cover or on the side of the ball pin, for example with an ultrasound technique, after the bearing shell has been pressed into the conical joint housing. The flange on the bearing shell can be formed in addition to or instead employing a locking ring.

According to another embodiment of the invention, the bearing shell can include a preferably circumferential surface recess in the region of the ball equator of the ball-and-socket joint on the side of the ball and/or on the side of the housing. The recess near the ball equator relieves the region of the bearing shell close to the equator which tends to have the smallest wall thickness, from the radial forces produced during the pressing operation. This approach can eliminate an uneven force distribution between the ball and the bearing shell, which can cause the ball in the bearing shell to jam or the ball and bearing shell to wear unevenly.

According to another embodiment of the invention, the bearing shell can include lubrication grooves on the side facing the ball, whereby the lubrication grooves are connected with the interior space of the bearing shell that faces the ball pin. The contact surface between the bearing shell and the ball pin can then be permanently lubricated and lubricants can be reliably transported from the storage area between the ball neck and the interior space of the bearing shell.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 2:
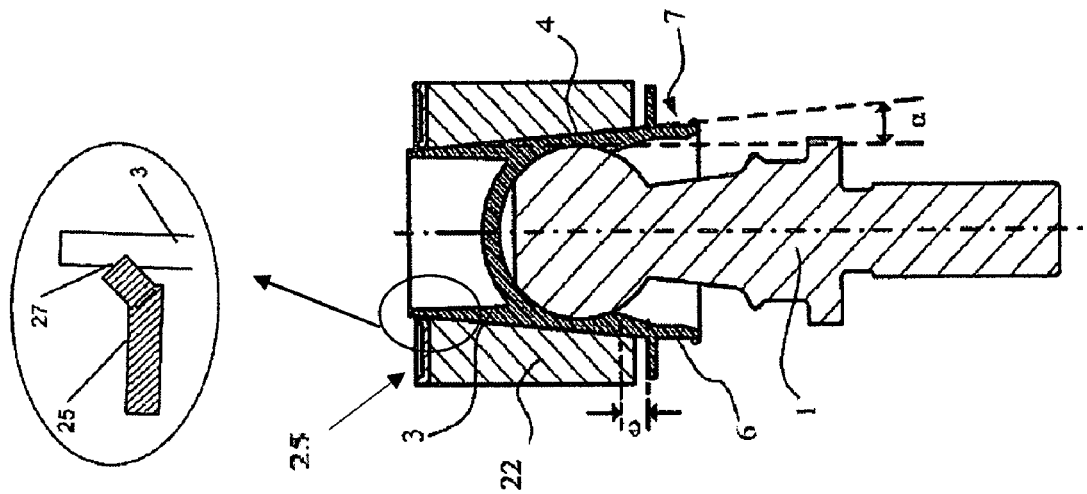
FIG. 2 shows a schematic diagram of another embodiment of a ball-and-socket joint according to the present invention similar to FIG. 1.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
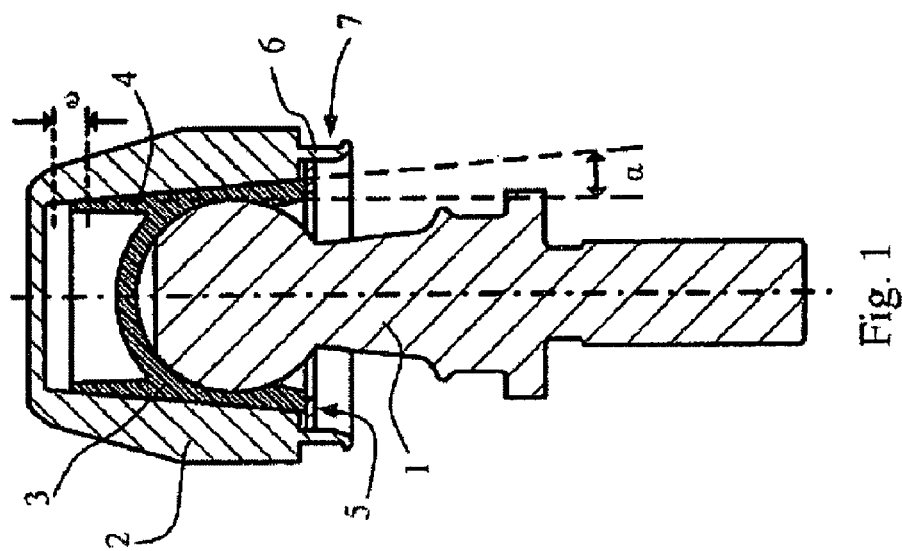
FIG. 1 shows schematically a longitudinal cross-sectional view of a first embodiment of a ball-and-socket joint according to the present invention.

Turning now to the drawing, and in particular to FIG. 1, there is shown a longitudinal cross-sectional view of a first embodiment of a ball-and-socket joint according to the invention. The ball-and-socket joint includes a ball pin 1, a joint housing 2 and a bearing shell 3 which is largely fabricated of plastic. The joint housing 2 which has an inside contour 4 shaped as a truncated cone. The bearing shell 3, which also has an outside contour shaped as a truncated cone, together with the ball pin 1 are pressed into the joint housing 2 when the ball-and-socket joint is assembled. The cone angle $\alpha$ is selected to be small enough so that the joint housing 2 and the bearing shell 3 automatically lock together for the selected material combination, i.e., the essentially radial pressing force between the joint housing 2 and the bearing shell 3 prevents the bearing shell 3 from accidentally sliding out of the joint housing 2 in the axial direction. As an additional safety measure, a locking ring 5 is arranged between the joint housing 2 and the bearing shell 3 that fixes the position of the bearing shell 3 in the joint housing 2. The bearing shell 3 can be secured in the position established during the pressing operation by positioning the locking ring 5 continuously on the interior side of the cylindrical region 6 of the joint housing 2. The outer surface of the cylindrical region 6 of the joint housing 2 has a groove 7 adapted to receive a corrugated boot (not shown) for sealing the ball-and-socket joint.

As depicted in the diagram of FIG. 1, the ball-and-socket joint of the invention can be installed much more reproducibly and safely due to, on one hand, the matching conical shape of the joint housing 2 and the bearing shell 3 and, on the other hand, the ability to adjust the bearing shell 3 in the joint housing 2 in the axial direction of the ball pin. The adjustment range corresponds approximately to the range designated with the letter e. This configuration can significantly improve the connection between the bearing shell 3 and the joint housing 2, because the stiffness of a press fit between the joint housing 2 and the bearing shell 3 can not only be controlled and adjusted during assembly of the ball-and-socket joint by varying the pressing force in the axial direction, but is also enhanced by the long insertion depth due to the shallow cone angle $\alpha$ and the adjustability of e in the axial direction. Moreover, the connection between the bearing shell 3 and the joint housing 2 is substantially defined by the entire outside contour 4 of the bearing shell 3, which is exposed to a very high radial pressing force, and the entire length of the inside contour 4 of the joint housing 2. This is different from conventional devices, where the connection relies on only the shoulders of two axial limit stops of the bearing shell, which contact the corresponding end faces of the joint housing with often small pressing forces.

It is therefore easy to understand that the ball-and-socket joint constructed according to the invention is not only more reliable and can support a greater load in operation, but can also be produced more cost-effectively, because the ball-and-socket joint can essentially be assembled in a single pressing operation. The bearing clearance between ball pin 1 and bearing shell 3 as well as the total elasticity of the ball-and-socket joint and the initial breakaway torque and friction torque of the ball pin 1 of the ball-and-socket joint of the invention can also be manipulated and/or adjusted during manufacture, or at any time during its lifetime, by varying the insertion depth when the bearing shell 3 is pressed into the joint housing 2.

FIG. 2 shows a longitudinal cross-sectional view, similar to that of FIG. 1, of another embodiment of a ball-and-socket joint according to the invention. However, unlike the embodiment of FIG. 1, the ball-and-socket joint of FIG. 2 has a joint housing 22 with an essentially open, annular shape configuration of as well as a different arrangement of the locking ring 25. The locking ring 25 with secures the position of the pressed-in bearing shell 3 in the joint housing 22, is in the ball-and-socket joint of FIG. 2 arranged on the upper end face of the joint housing 22 that faces the ball pin 1 (as viewed in the direction of the drawing).

With this arrangement of locking ring 25, the locking ring 25 can advantageously be positioned more easily and more quickly, because the side of the joint housing 22 that faces away from the ball pin is more readily accessible during the assembly of the ball-and-socket joint. In addition, the construction of the ball-and-socket joint, in particular the shape of the joint housing becomes much simpler, as is evident from a comparison of FIGS. 1 and 2.

As seen in FIG. 2, if the locking ring 25 is arranged opposite the ball pin 1, then the joint housing 22 of the ball-and-socket joint is formed essentially only by the ring-shaped body 22. Moreover, the boot groove 7 can also be easily arranged on the plastic bearing shell 3. The greater diameter and width of the locking ring 25 also increase its elasticity, which in turn increases the clamping force of the locking ring 25, so that the bearing shell 3 and the joint housing 22 are particularly securely connected. The locking ring 25 also locks very securely because the sharp clamping edge arranged on its inside diameter can cut into the relatively soft outside surface 4 of the plastic bearing shell 2 at 27. By locating the locking ring 25 on the side facing away from the ball pin 1, the side of the bearing shell facing the ball pin 1 can be more freely designed, which improves the construction of the ball-and-socket joint and permits particularly large maximum tilt angles.

Figure 3:
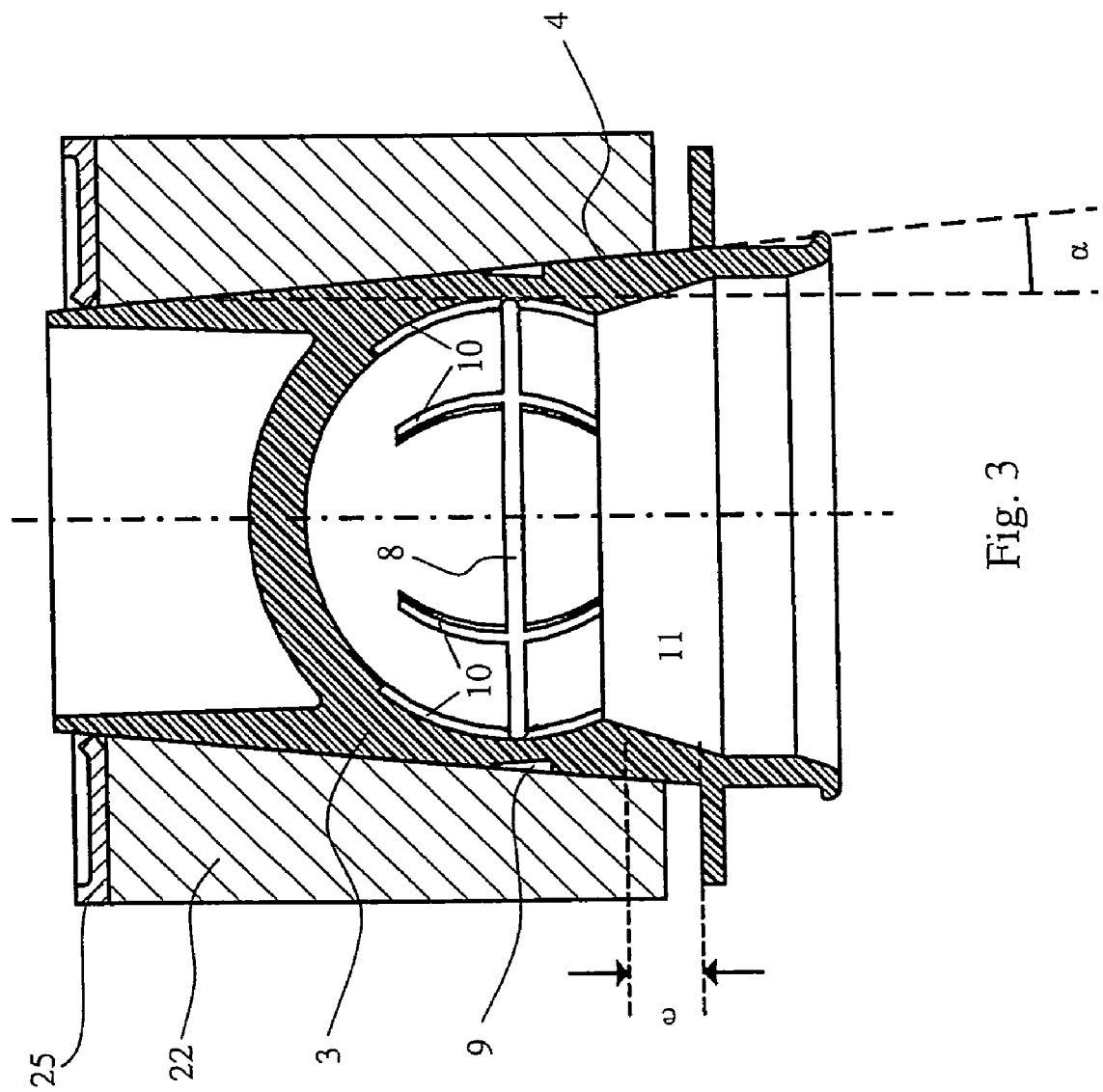
FIG. 3 shows in an enlarged cross-sectional view, similar to FIGS. 1 and 2, a diagram of the joint housing and bearing shell for a ball-and-socket joint according to FIG. 2.

FIG. 3 shows on an enlarged scale a schematic cross-sectional view of an embodiment of the ball-and-socket joint of the invention in the region of the joint housing 22 and the bearing shell 3. This is a modification of the ball-and-socket joint where the locking ring 25 is arranged on the side of the joint housing 22 facing away from the ball pin. FIG. 3 also demonstrates the axial adjustment range e of the bearing shell 3 in the joint housing 22 according to the invention, and more particularly two equatorial recesses 8 and 9. One equatorial recess 8 is arranged circumferentially on the surface of the bearing shell 3 facing the ball, whereas the other equatorial recess 9 is also arranged circumferentially of the surface 4 of the bearing shell 3, but faces the joint housing 22. The equatorial recesses 8, 9 are designed to reduce the radial stress in the region of the bearing shell 3 close to the equator that is produced when the bearing shell 3 is pressed into the joint housing 22. These could otherwise cause the swivel ball to jam in the bearing shell 3, or could cause an uneven wear of swivel ball and bearing shell 3 during operation of the ball-and-socket joint, in particular since the bearing shell has the smallest wall thickness in the region of the swivel ball close to the equator.

FIG. 3 also shows a number of lubrication grooves 10 distributed along the circumference of the bearing shell 3 and designed to evenly distribute lubricant between the bearing shell 3 and the swivel ball. The end sections of the lubrication grooves 10 (which points downwardly in the drawing) are open and connected with the interior space 11 of the bearing shell 3 in the region of the ball neck (not shown). A supply of lubricant can be deposited in that region during assembly of the ball-and-socket joint, with the lubrication groove 10 continuously supplying lubricant to the sliding region between the bearing shell 3 and the swivel ball. In addition, the interior equatorial recess 8, which connects the lubrication grooves 10 with each other, is also available for distributing the lubricant.

As a result, the service life and the robustness of ball-and-socket joints of the invention, for example ball joint used in articulated supports, as well as the reproducibility of those properties of the ball-and-socket joints related to their quality can be significantly improved during their manufacture. The invention not only improves the quality of the product, but also significantly simplifies the fabrication of the ball-and-socket joints and reduces their cost.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A ball-and-socket joint comprising:
   a joint housing having an inside contour shaped as a truncated cone;
   a bearing shell disposed in an interior space of the joint housing, said bearing shell having an outside contour shaped as a truncated cone and a continuous circumferential surface recess extending annularly in an equatorial region of the ball, said recess located on a side of the bearing shell facing the housing;
   a ball pin defining an axial direction and having disposed thereon a ball, said ball slidingly received in the bearing shell,
   a locking ring having an inner clamping edge, said locking ring disposed on an end face of the joint housing and contacting the bearing shell, thereby fixing a position of the bearing shell relative to the joint housing in the axial direction of the ball pin,
   wherein the bearing shell passes through the locking ring and is freely positionable in the joint housing in the axial direction of the ball pin before being locked in position by the inner clamping edge cutting into the outside contour of the bearing shell.

2. The ball-and-socket joint of claim 1, wherein a slope of the truncated cone of the bearing shell and a slope of the truncated cone of the joint housing are substantially identical.

3. The ball-and-socket joint of claim 2, wherein the slope of the truncated cone of the bearing shell and the slope of the truncated cone of the joint housing are each approximately 5:1.

4. The ball-and-socket joint of claim 1, wherein the joint housing has a flat end face oriented perpendicular to a longitudinal axis of the joint housing and facing away from the ball pin, and wherein the locking ring rests on the end face of the joint housing and cuts into the bearing shell, thereby preventing the bearing shell from moving in the joint housing toward the ball pin.

5. The ball-and-socket joint of claim 4, wherein a diameter of the truncated cone of the joint housing increases from the locking ring toward the ball pin, as viewed in an axial direction of the truncated cone.

6. The ball-and-socket joint of claim 1, wherein the bearing shell comprises a flanged portion disposed on an end of the joint housing facing away from the ball pin, said flanged portion formfittingly anchoring the bearing shell in the joint housing.

7. The ball-and-socket joint of claim 6, wherein the flanged portion is formed by ultrasound.

8. The ball-and-socket joint of claim 1, wherein the bearing shell further comprises a continuous circumferential surface recess extending annularly in an equatorial region of the ball, said recess located on a side of the bearing shell facing the ball.

9. The ball-and-socket joint of claim 1, wherein the bearing shell comprises lubrication grooves arranged on a side of the bearing shell facing the ball, wherein the lubrication grooves are connected with an interior space of the bearing shell that faces of the ball pin.

10. The ball-and-socket joint of claim 1, wherein the bearing shell comprises at least two continuous circumferential surface recesses extending annularly in an equatorial portion of the ball, with a first of said at least two surface recesses located on a side of the bearing shell facing the ball and a second of said at least two surface recesses located on a side of the bearing shell facing the housing.

11. The ball-and-socket joint of claim 1, wherein the clamping edge is arranged on an interior periphery of the locking ring.

12. The ball-and-socket joint of claim 1, wherein the inner edge of the locking ring that cuts into the outside contour of the bearing shell is bent in a direction facing away from the ball pin.

13. The ball-and-socket joint of claim 1, wherein the locking ring is completely arranged outside the joint housing.

14. The ball-and-socket joint of claim 1, wherein the bearing shell and the joint housing are securely connected to one another by means of a clamping force of the locking ring.

* * * * *